Patented Feb. 6, 1923.

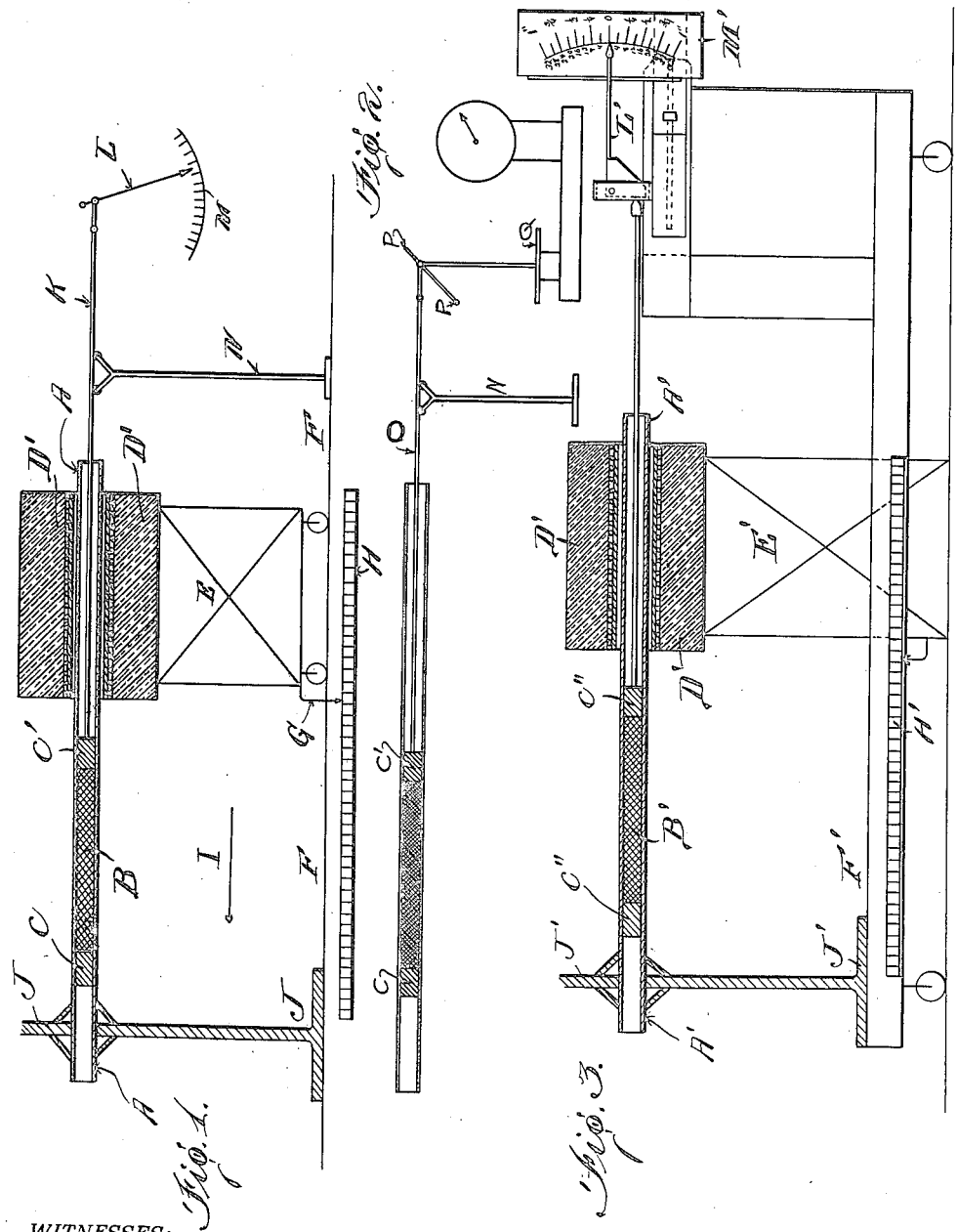

1,444,567

UNITED STATES PATENT OFFICE.

FREDERICK W. SPERR, JR., OF OAKMONT, PENNSYLVANIA, ASSIGNOR TO THE KOPPERS COMPANY, OF PITTSBURGH, PENNSYLVANIA, A CORPORATION OF PENNSYLVANIA.

METHOD OF AND APPARATUS FOR TESTING MATERIALS.

Application filed July 24, 1918. Serial No. 246,599.

*To all whom it may concern:*

Be it known that I, FREDERICK W. SPERR, Jr., a resident of Oakmont, Allegheny County, Pennsylvania, have invented a new and useful Method of and Apparatus for Testing Materials, of which the following is a full, clear, and exact description, reference being had to the accompanying drawings, forming part of this specification, in which—

Figures 1 and 2 are diagrammatic views embodying my invention.

Figure 3 is a similar view showing a modification.

This invention relates to a method for testing the behavior of substances on heating and also to apparatus that I have developed to carry out this method. The method and apparatus have been more particularly designed for the testing of coal, the behavior of which at high temperatures is of great importance in the arts; and in the ensuing description I have usually referred to coal as the substance to be tested, but it is to be understood that the method may also be applied to a wide variety of other materials. My method offers a means of determining all or any of the following important characteristics of a material.

1. The rate of volume change under progressive heating and the total volume change after heating.

2. The pressure developed by the material when heated in a confined space.

3. The character of the product formed after subjecting the material to progressive heating at various rates.

4. The nature and quality of any byproduct formed by progressive heating of the material.

It may readily be seen that such information is of importance in relation to a wide range of material.

In the case of coal, it is often desirable to determine, upon a small scale, the quality of the residue left after heating the coal to a given temperature. This is of particular interest in connection with the investigation of coking coals, since the quality of the coke made from such coal is of very great industrial importance. Moreover, certain coals expand during the coking process, while others contract. In the case of coals which expand, it is necessary to be able to determine the amount of pressure developed when the coals are coked in a confined space. The behavior of coal upon heating, the nature of the coke and byproducts, the amount of expansion or contraction, and the pressure developed during coking are profoundly affected by such factors as the rate of heating, total time of heating and temperature.

In the industrial coking of coal, it has been proven by a number of different investigators that the heat penetration proceeds in such a way that the zone of high temperature in which the coking has taken place is always marked by rather sharply defined limits. When the coking has advanced, say, four inches from the wall of the oven, the temperature at that point will be quite high—possibly over 800° C., while two inches further in toward the center of the oven the temperature will be several hundred degrees lower. Some of the most important features of the coking process appear to be related to this manner of heat penetration, and if satisfactory results on small scale tests are expected, this condition must be imitated as closely as possible. This is what is accomplished by my method. One form of apparatus that I have used is shown in diagrammatic form in Figure 1.

In the tube A is placed a sample of coal, occupying the space B. The coal is preferably pulverized to approximately 20 mesh size, although other degrees of fineness may be used. A weighed quantity of coal is always used. The sample is held in place by the plugs C and C'. Plug C is preferably fixed so as to prevent expansion of the coal toward the cold end of the tube while plug C' is movable. Plug C, however, might be made removable to facilitate the insertion and removal of the test material. The tube A is preferably made of fused quartz although other refractory material, such as glass, porcelain, or iron may be used. Quartz is preferred on account of its refractory quality and low coefficient of expansion. The tube A is supported at one end by the support J, while the other end rests upon the furnace D. The source of heating is the electric furnace D, which fits over the tube and has a tubular heating chamber, the length of which is preferably somewhat greater than the length of the sample and than the length of the section B occupied by the sample. The furnace D may also be heated by gas, although an electric furnace is preferable. The furnace D is mounted on a carriage E, which runs over the track F. A pointer G attached to the carriage indicates upon the scale H the exact position of the end of the heating chamber of the furnace with respect to the end of the section occupied by the coal sample.

When testing coal, I weigh out such a sample that the space B is approximately 9 inches long, corresponding to the distance from the wall to the center of the usual by-product coke oven.

In its simplest form, the test consists in moving the furnace D slowly in the direction of the arrow I until the furnace covers all of the section B. The tube is then removed from its support and from the furnace and the residue in section B taken out for examination. In the case of a good coking coal, this residue consists of a neat cylinder of coke. The total expansion or contraction that has taken place in the coking operation may be obtained by measuring the length of this cylinder. Various rates of coking may be imitated by moving the furnace faster or slower, always timing the progress of heating with reference to the position of the pointer G on the scale H. Various temperatures of coking may be tested by varying the temperature of the furnace D.

The laws of physics show that the time required for the flow of heat through a solid mass, one face of which is being heated, or in other words, the time required to effect a predetermined increase of temperature, is proportional to the square of the distance from the heated face. Certain investigations show that this law is approximately applicable to the progress of heating in the coking of coal. In order to make the small scale tests comparable with actual practice, it is desirable to conform to this law of heating which may be readily done with my apparatus. I have found it preferable to advance the furnace over the section B at a rate in which the distance traveled is a function of the square root of the time. For example, suppose the total section 9 inches long is to be heated in four hours, then according to the square root rule, one-half of the 9 inches would be traversed in the first hour. $\sqrt{1/2 \times 9''}$ in the first two hours, the $\sqrt{3/4 \times 9''}$ in the first three hours, etc. I have adopted the practice of making heating curves corresponding to each rate of heating and these are followed by moving the apparatus by hand, but an apparatus may also be used in which the motion is made automatic by clock work or otherwise.

In the simplest method of testing, it is not absolutely essential to the principle of the method to use the plugs C and C', although better results are obtained by using these plugs.

When it is desired to determine the expansion or contraction of the sample at various stages of heating, a light rod K is placed with one end in contact with the removable plug C', the other end operating against a pointer L suspended in such a way as to indicate the movements of the plug on the scale M. The apparatus may be arranged so that the weight of the pointer is sufficient to keep the rod K in contact with the plug through any contraction that may take place, but other means may be used to this end. The rod K moves upon bearings placed on the support N.

In case it is desired to determine the pressure exerted at various stages of heating, the apparatus shown in Figure 2 is used. Here, for sake of simplicity, the tube is shown without supports or furnace. The rod O which is preferably made of silica and is stronger than the rod K, shown in Figure 1, is held firmly in contact with the plug C' and rests upon the support N. By a suitable arrangement of levers PP, the pressure developed is transmitted to the pan of a balance Q which is of a type requiring a very small degree of movement to indicate a given pressure. Balances may be obtained in which the required movement is less than 1/8 inch. For this purpose, I prefer to use a platform scale, such for instance, as that defined in the Bureau of Standards Bulletin, issued May 1915, entitled "Tolerances and Specifications for Weights and Measures and Weighing and Measuring Devices." The specific form of scale adapted for this purpose is one manufactured by the Toledo Scale Company, of Toledo, Ohio, and known as "scale No. 641."

While I have illustrated in Figures 1 and 2 a form of my invention in which the tube is stationary and the furnace stationary, I may use a stationary furnace and move the tube therethrough. This modification of my invention is shown in Figure 3, in which the corresponding parts have been given the same reference numerals as in Figures 1 and 2, but with the affix " ' " applied thereto. In this figure, I have also indicated more mechanically the character of the indicator which may be employed in indicating the extent of the expansion or contraction of the test sample. It consists of a pointer L', adapted to move over a scale M', and carried by a bell crank lever which is acted upon by the rod attached to the plug C". If it is desired simply to ascertain the character of the product resulting from heating, both plugs C C' may be held in fixed relation to each other. Various other changes can be made in the details of construction and arrangement of the parts without departing from the spirit and scope of my invention as defined in the claims.

The words "tube" and "tubular" as used herein and in the claims with respect to the container employed are to be broadly construed as covering any container of suitable character in which a test sample can be confined and treated as described.

I claim:

1. Apparatus for testing materials, comprising a refractory container adapted to contain a sample of the material to be tested, said container having a movable element adapted to be actuated by the expansion or contraction of said sample, and heating means whereby that portion of the container containing the sample may be heated, the heating means and the container being movable relatively to each other to progressively heat the sample.

2. Apparatus for testing materials, comprising a refractory container adapted to contain a sample of the material to be tested, such container having a movable element adapted to be actuated by the expansion or contraction of said sample, a furnace for heating the container, and means for moving the container and furnace relatively to each other to progressively heat the sample.

3. Apparatus for testing the behavior of substances on heating, comprising a refractory tube adapted to contain a sample of the substance, a movable plug fitting against the end of the sample, and a furnace adapted to heat the tube, the tube and furnace being so mounted that one may be moved relatively to the other, so that the sample may be heated progressively from one end to the other.

4. Apparatus for testing the behavior of substances on heating, comprising a refractory tube adapted to contain a sample of the substance, a movable plug fitting against the end of the sample, and a furnace adapted to heat the tube, the tube being stationary and the furnace so mounted that it may be moved along the tube so that the sample may be heated progressively from one end to the other.

5. Apparatus for testing the expansion or contraction of substances on heating, comprising a refractory tube adapted to contain a sample of the substance, a movable plug fitting against the end of the sample, and apparatus connected to said plug to indicate or record the expansion or contraction of the sample on heating and a furnace adapted to heat the tube, said tube and furnace being so mounted as to permit of relative motion so that the sample may be heated progressively from one end to the other.

6. Apparatus for testing the behavior of substances on heating, comprising a refractory tube adapted to contain a sample of the substance, plugs fitting against the ends of the sample, the plug nearest the source of heat being movable and the opposite plug being fixed, and a furnace adapted to heat the tube, the tube and furnace being so mounted that one may be moved relatively to the other so that the sample may be heated progressively from one end to the other.

7. Apparatus for testing the behavior of substances on heating, comprising a refractory tube adapted to contain a sample of the substance, plugs fitting against the ends of the sample, the plug nearest the source of heat being movable and the opposite plug being fixed, and a furnace adapted to heat the tube, the tube being stationary and the furnace so mounted that it may be moved along the tube so that the sample may be heated progressively from one end to the other.

8. Apparatus for testing materials, comprising a refractory container having a comparatively long chamber to contain a sample of the material to be tested, said container having a movable element adapted to be actuated by the expansion or contraction of said sample, the container and furnace being relatively movable to each other and having guiding means so that the sample is progressively heated from one end to the other.

9. Apparatus for testing the expansion and contraction of substances on heating, comprising a refractory tube adapted to contain a sample of the substance, plugs fitting against the ends of the sample, the plug nearest the source of heat being movable, and the opposite plug being fixed, and apparatus connected to the movable plug to indicate or record the expansion or contraction of the sample on heating, the tube and furnace being so mounted as to permit of relative motion so that the sample may be heated progressively from one end to the other.

10. Apparatus for testing the behavior of substances on heating, comprising a refractory tube adapted to contain a sample of the substance, plugs fitting against the ends of the sample, and a furnace adapted to heat the tube, the tube and furnace being so mounted that they may be moved relatively to each other, so that the sample may be heated progressively from one end to the other.

11. Apparatus for testing the behavior of substances on heating, comprising a refractory tube adapted to contain a sample of the substance, plugs fitting against the ends of the sample, and a furnace adapted to heat the tube, the tube and the furnace being so mounted that one may be moved relatively to the other so that the sample may be heated progressively from one end to the other.

12. The herein described method of testing the behavior of substances on heating, consisting in enclosing a sample of the substance in a refractory container, applying heat progressively from one end to the other of the sample by moving the two relatively to a heated zone and maintaining the progressively heated increments of said sample in their heated condition until the entire sample is heated to a substantially uniform temperature.

13. The herein described method of testing the behavior of substances on heating, consisting in enclosing a sample of the substance in a refractory container and applying heat progressively from one end of the sample to the other by moving the container and sample relatively to a heater having a heated zone of substantially the same length as the section of the container occupied by the sample whereby the entire sample is progressively raised to a substantially uniform temperature throughout.

14. The herein described method of testing the behavior of substances on heating, consisting in enclosing a sample of the substance in a refractory container, applying heat progressively from one end of the sample to the other by moving a heater having a heated zone progressively over the section of the container occupied by the sample and maintaining the progressively heated increments of said sample in their heated condition until the entire sample is heated to a substantially uniform temperature.

15. The herein described method of testing the behavior of substances on heating, consisting in enclosing a sample of the substance in a refractory container and applying heat progressively from one end of the sample to the other by moving a heater having a heated zone progressively over the section of the container occupying the sample, said heated zone being of substantially the same length as the section occupied by the sample whereby the entire sample is progressively raised to a substantially uniform temperature throughout.

16. The herein described method of testing the behavior of substances on heating, consisting in enclosing a sample of the substance in a refractory container and applying heat progressively from one end of the sample to the other, in such a way that the fraction of the total length of the sample over which the heating is caused to extend at any given time is proportional to the square root of the corresponding fraction of the total time of heating.

17. The herein described method of testing the behavior of substances on heating, consisting in enclosing a sample of the substance in a refractory container and applying heat progressively from one end of the sample to the other by moving the two relatively to a heated zone, and measuring the degree of expansion or contraction of said substance while it is being so heated.

18. The herein described method of testing the behavior of substances when heated, which consists in enclosing a sample of the substance to be treated in a refractory container, first applying heat to one end portion of such sample, and then progressively increasing the extent of the heated zone towards the other end of the sample, and causing the physical changes occasioned in the sample by the progressive heating to be indicated.

19. The herein described method of testing the behavior of substances when heated, which consists in enclosing a sample of the substance to be tested in a refractory container, applying heat first to one end portion of such sample and then progressively extending the heating action towards the other end of the sample, while moving the sample relatively to a heated zone, and utilizing the changes occasioned in the sample by heating to actuate an indicating device.

In testimony whereof, I have hereunto set my hand.

FREDERICK W. SPERR, JR.